April 15, 1930.  E. P. B. ECKARDT  1,755,106
METER FOR COMPRESSED GAS
Filed April 18, 1925
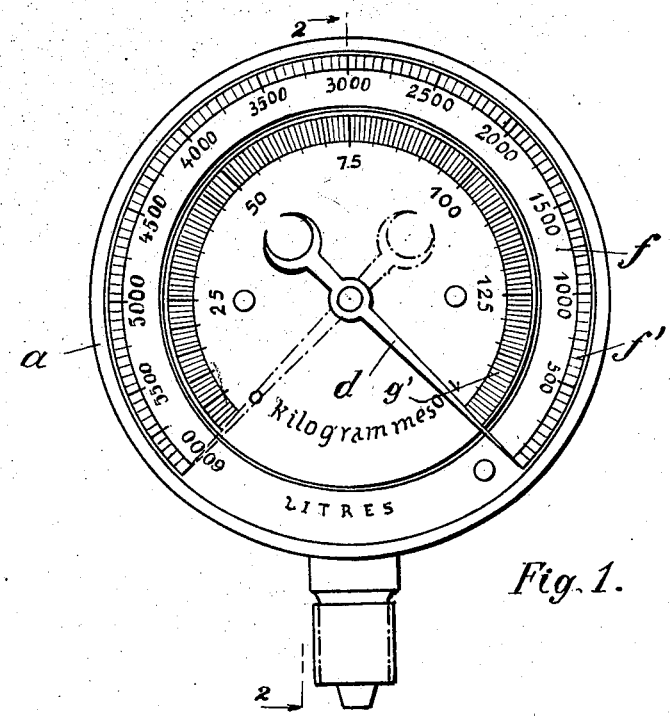
Fig. 1.
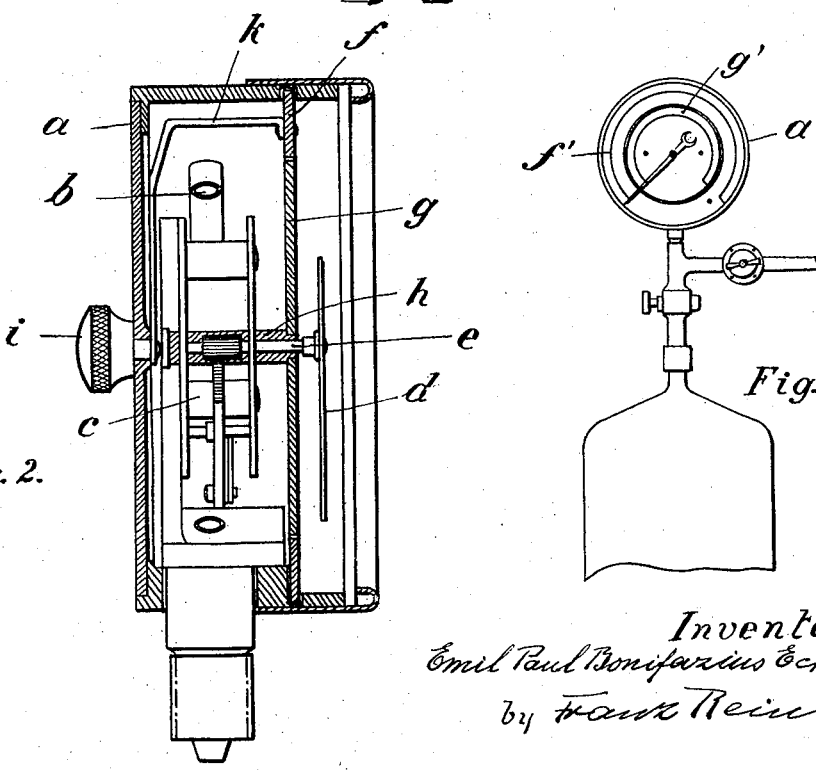
Fig. 2.
Fig. 3.
Inventor:
Emil Paul Bonifazius Eckardt
by Frank Reinhold
Attorney.

Patented Apr. 15, 1930

1,755,106

UNITED STATES PATENT OFFICE

EMIL PAUL BONIFAZIUS ECKARDT, OF STUTTGART, GERMANY

METER FOR COMPRESSED GAS

Application filed April 18, 1925, Serial No. 24,154, and in Germany June 3, 1924.

My invention relates to improvements in meters for compressed gas, and more particularly in meters for measuring the amount of gas delivered from receptacles containing the said gas under pressure. The object of the improvements is to provide a pressure gage by means of which the said amount of gas can be directly ascertained though the pressure of the gas confined within the receptacle is gradually reduced by the delivery of the gas. With this object in view my invention consists in providing the pressure gage, in addition to the scale marks indicating the pressure, with subsidiary scale marks ascending in a direction opposite to that of the pressure indicating scale marks and directly indicating the volume of the delivered gas. Preferably, the said subsidiary scale marks are provided on a slide adapted to be shifted relatively to the pressure scale marks for setting the same with the zero mark in position coinciding with the pressure scale mark or the pointer indicating the pressure at the beginning of each tapping operation.

For the purpose of explaining the invention an example embodying the same has been shown in the accompanying drawing in which the same reference characters have been used in all the views to indicate corresponding parts. In said drawing, Fig. 1, is an elevation showing the pressure gage, Fig. 2, is a sectional elevation taken on the line 2—2 of Fig. 1, and Fig. 3, shows the gage as used on a receptacle containing gas under pressure.

The general construction of the pressure gage is known in the art and I deem it not necessary to describe the same in detail.

In the example shown in the drawing the pressure gage consists of a casing $a$ containing a tubular spring $b$ connected by a suitable gearing $c$ with the shaft $e$ carrying the hand or pointer $d$. The hand $d$ is movable in front of scale marks $g'$ provided on a stationary disk $g$ secured to a fixed bolt $h$, and the said scale marks indicate the pressure of the gas confined within the storage receptacle. The stationary scale marks $g'$ are surrounded by scale marks $f'$ provided on a movable ring $f$ disposed concentrically of the disk $g$. The ring $f$ is secured to one or more arms $k$ fixed to a milled button $i$, and it is adapted to be turned by means of the said button. As appears from Fig. 1 the stationary scale marks $g'$ ascend in clockwise direction, while the movable scale marks $f'$ ascend in anti-clockwise direction, and the scale marks $f'$ are divided so as to indicate the amount of gas in certain units such for example as liters.

If the pressure of the gas contained within the storage receptacle is at its maximum, the hand $d$ is located in front of the highest mark of the stationary scale marks $g'$, as is shown in Fig. 1 in full lines. If it is desired to take a certain amount of gas from the storage receptacle, the movable ring $f$ is turned with its zero scale mark in position at the rear of the hand $d$, and if now a certain amount of gas is taken from the receptacle, and the pressure of the gas within the receptacle is reduced accordingly, the hand $d$ moves over the scale marks $g'$ and $f'$ in anti-clockwise direction, thus showing on the stationary scale marks $g'$ the reduced pressure of the gas and on the movable scale marks $f'$ the volume of the gas taken from the receptacle. If thereafter gas is again taken from the receptacle, the movable scale marks are at first shifted with the zero mark into position at the rear of the hand $d$, whereupon the desired amount of gas is taken from the receptacle, said amount being again indicated in liters on the movable scale marks $f'$. The same operation may be repeated, until the supply of gas from the receptacle is exhausted and the hand arrives in front of the zero mark of the stationary scale marks.

As appears from the foregoing description the pressure gage permits to ascertain the pressure of the gas within the receptacle, and the volume at atmospheric pressure of the gas delivered from the receptacle.

It will be understood that the apparatus may also be used by having the scale marks $f'$ stationary, in which case however, the difference of the indications on the said scale marks at the beginning and at the end of each delivery must be taken.

The relation between the scale marks appears from the following: When taking gas from a receptacle containing the same under pressure, the temperature may be assumed to be constant. Therefore, the weight G of the gas confined within a receptacle of a certain capacity at the pressure $p$ is $$G = \text{const. } p.$$

If now equal weights $g$ are tapped from the receptacle so as to reduce the amount confined therein first from $G_1$ to $G_2$ and thereafter from $G_2$ to $G_3$, the pressure will be reduced as follows:

$$G_1 = \text{const. } p_1$$
$$G_2 = \text{const. } p_2$$
$$G_3 = \text{const. } p_3$$
$$g = G_1 - G_2 = G_2 - G_3$$

Therefore:

$$g = \text{const. } (p_1 - p_2) = \text{const. } (p_2 - p_3)$$

It appears therefore that the scale marks of the gage showing the pressure might be used for indicating the amounts of gas taken from the receptacle, the reduction of the pressure say from 10 atmospheres to 9 atmospheres, or from 7 atmospheres to 6 atmospheres, corresponding to definite weights of gas, which weights, of course, depend on the capacity of the receptacle, the temperature, and the character of the gas. Therefore, the stationary scale might be provided with inscriptions indicating the weight of the gas confined within the receptacle (or the volume thereof at atmospheric pressure), and for ascertaining the amount of gas taken from the receptacle by one tapping operation, the attendant takes the difference of the indications displayed by the gage before and after tapping. Or, when using an ordinary pressure gage having only inscriptions indicating pressure, the attendant takes the difference of the pressure before and after tapping and multiplies the same by a certain constant factor in order to obtain the volume. In the example shown in the drawing such calculation is dispensed with by providing the movable scale $f, f^1$ with inscriptions indicating volumes or weights. However, in order that the indications of the said movable scale correspond to the scale $g^1$ at any part of the length thereof, the pitch of the scale marks $g^1$ and that of the scale marks $f^1$ must be constant. The same pressure gage may be used in connection with receptacles of any capacity or gas of any character. But the movable scale and its inscriptions must be adapted to the capacity of the receptacle and the character of the gas.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. An apparatus for measuring the volume of gas taken from a receptacle containing the said gas under pressure, comprising a pressure gage provided with a pressure controlled member adapted to be moved proportionally with the pressure, a dial plate having scale marks of even pitch cooperating with said member, and guiding means provided on said pressure gage on which said dial plate is mounted so as to be shiftable in the direction of the movement of said member, said scale marks ascending in a direction from maximum pressure of the gage to zero pressure thereof and directly indicating volumes of gas delivered from said receptacle.

2. An apparatus for measuring the volume of gas taken from a receptacle containing the said gas under pressure, comprising a pressure gage provided with a pressure indicating member, a dial plate provided with scale marks cooperating with said member and representing pressure, a second dial plate provided with scale marks of even pitch cooperating with said member, and guiding means provided on said pressure gage on which said dial plate is mounted so as to be shiftable in the direction of the movement of said member, said scale marks ascending in a direction from maximum pressure of the gage to zero pressure thereof and directly indicating volumes of gas delivered from said receptacle:

3. An apparatus for measuring the volume of gas taken from a receptacle containing the said gas under pressure, comprising a pressure gage provided with a pressure indicating member, a dial plate provided with scale marks cooperating with said member and representing pressure, a second dial plate provided with scale marks of even pitch cooperating with said member and guiding means provided on said pressure gage on which said dial plate is movable in the direction of the movement of said member, said scale marks of said second dial plate ascending in a direction from maximum pressure of the gage to zero pressure thereof and representing volumes of gas reduced to atmospheric pressure delivered from said receptacle.

4. An apparatus for measuring the volume of gas taken from a receptacle containing the said gas under pressure, comprising a pressure gage provided with a casing, a pressure indicating member, a dial plate provided with scale marks cooperating with said member and representing pressure, a second dial plate provided with scale marks of even pitch cooperating with said member, guiding means provided on said pressure gage on which said dial plate is movable in the direction of the movement of said member, a handle connected with said second dial plate and located outside said casing, said scale marks of said second dial plate representing volumes of gas reduced to atmospheric pressure delivered from said receptacle and ascending in a direction from maximum pressure of the gage to zero pressure thereof.

In testimony whereof I hereunto affix my signature.

EMIL PAUL BONIFAZIUS ECKARDT.